United States Patent
Beyer, Jr.

(10) Patent No.: US 7,672,681 B1
(45) Date of Patent: Mar. 2, 2010

(54) METHOD OF RENAMING SOFT SWITCH CONTROLS IN ALL PARTICIPANT'S CELL PHONES BY AN ADMINISTRATOR

(76) Inventor: Malcolm K. Beyer, Jr., 92 Lighthouse Dr., Jupiter Inlet Colony, FL (US) 33469-3504

( * ) Notice: Subject to any disclaimer, the term of this patent is extended or adjusted under 35 U.S.C. 154(b) by 405 days.

(21) Appl. No.: 11/623,450

(22) Filed: Jan. 16, 2007

Related U.S. Application Data

(63) Continuation-in-part of application No. 11/308,648, filed on Apr. 17, 2006, which is a continuation-in-part of application No. 10/711,490, filed on Sep. 21, 2004, now Pat. No. 7,031,728.

(51) Int. Cl.
*H04W 24/00* (2009.01)
(52) U.S. Cl. ............. 455/457; 455/456.1; 455/566; 455/550.1; 701/207
(58) Field of Classification Search ............. 455/422.1, 455/458, 460, 456.1–457, 550.1, 566; 370/310, 370/312; 701/200, 207, 208, 209, 210, 211–214
See application file for complete search history.

(56) References Cited

U.S. PATENT DOCUMENTS

| | | | |
|---|---|---|---|
| 6,434,403 B1 * | 8/2002 | Ausems et al. ............. 455/556.2 |
| 7,305,242 B2 * | 12/2007 | Zakharia et al. ............. 455/456.1 |
| 7,366,547 B2 * | 4/2008 | Hasegawa et al. ............. 455/566 |
| 2002/0137502 A1 * | 9/2002 | Cronin et al. ............. 455/419 |
| 2004/0192331 A1 * | 9/2004 | Gorday et al. ............. 455/456.1 |
| 2005/0032525 A1 * | 2/2005 | Gasbarro ............. 455/456.1 |

* cited by examiner

*Primary Examiner*—Kamran Afshar
*Assistant Examiner*—Neda Behrooz
(74) *Attorney, Agent, or Firm*—Malin Haley DiMaggio Bowen & Lhota

(57) ABSTRACT

A method, a combined cellular phone, PDA, GPS communication device and system having specialized software applications for allowing a plurality of combined cellular phone/PDA device users to monitor each other's locations and status, to initiate cellular phone calls by touching a symbol on the touch screen display with a stylus which can also include point to call conferencing calling. Each participant's cellular phone/PDA device includes a GPS navigation receiver with application software for point to call cellular phone initiation to participants and geographical entities including vehicles, persons or events, conference calls and video transfers. An administrator can: (a) create and remotely install new symbology and modify the symbols and nomenclature used in each participant's cell phone screen display for a specific environment such as police and military; (b) create and remotely install screen drawn soft switches used in each participant's cell phone, the activation of which accesses application software; and (c) create and remotely install screen drawn soft switches used in each participant's cell phone, the activation of which accesses a URL address.

12 Claims, 5 Drawing Sheets

METHOD OF RENAMING SOFT SWITCH CONTROLS IN ALL PARTICIPANT'S CELL PHONES BY AN ADMINISTRATOR

This application is a continuation-in-part of U.S. patent application Ser. No. 11/308,648 filed Apr. 17, 2006 which is a continuation-in-part of U.S. patent application Ser. No. 10/711,490 now U.S. Pat. No. 7,031,728.

BACKGROUND OF THE INVENTION

1. Field of the Invention

A communications system using a plurality of cellular phone devices each having an integrated PDA and CPU and a GPS receiver for the management of two or more people through the use of a communications network. The method and system provide each user with an integrated handheld cellular/PDA/GPS (cell phone device) includes a touch screen display and advanced communication software application programs (hereinafter referred to as ACS) and databases used in conjunction with a remote server that enable an administrator or user to modify all network participants' cell phone devices' display soft switches and symbology.

2. Description of Related Art

The purpose of a communications system is to transmit information bearing analog and digital messages from a source, located at one point, to a user destination, located at another point some distance away. A communications system is generally comprised of three basic elements: transmitter, information channel and receiver. One form of communication in recent years is cellular phone telephony. A network of cellular communication systems set up around an area such as the United States allows multiple users to talk to each other, either on individual calls or on group calls. Some cellular phone services enable a cellular phone to engage in conference calls with a small number of users. Furthermore, cellular conference calls can be established through 800 number services. Cellular telephony also now includes systems that include Global Positioning System (GPS) navigation that utilizes satellite navigation. These devices thus unite cellular phone technology with navigation information, computer information transmission and receipt of data.

The method and operation of communication devices used herein are described in U.S. Pat. No. 7,031,728 which is hereby incorporated by reference and pending U.S. patent application Ser. No. 11/308,648.

Each cell phone device includes a touch screen display that includes virtual control switches for the operation of the network communication and the ACS software programs. The virtually displayed switches on the touch screen are called soft switches. Each soft switch or matrix of soft switches are labeled or use abbreviations to convey information as to function.

The display screen on each cell phone device is typically a geographical display such as a chart or map of the network operating area that contains the active participants. The touch screen display can generate symbols that indicate participants, objects or events of current actions or activities. Thus, a screen could symbolically show a fireman, a fire truck and the location of a fire in real time. The symbols are the same on all user's cell phone devices. Each user can transmit or receive data correlated to specific symbols and utilizing specific soft switches that can be labeled for specific functions such as alerting other users to call all firemen in an area to a current fire. Thus, each cell phone device can be custom programmed for specific operational environments through its virtual soft switches and symbols generated and displayed for certain people, objects and events.

Using the invention described herein, a designated administrator using a personal computer (PC) or other input device can reprogram all user and network participants' cell phone devices to change, modify or create new virtual switch names and new symbols for a different operating environment.

An advantageous provision would be to provide a cell phone software program that provides the system administrator the ability to generate display symbology and add or redefine the local and remote cell phone devices' soft switches that specify the symbols for all network participants for a specific environment such as a military, police, fire and other emergency environments.

SUMMARY OF THE INVENTION

Applicant's communication system and method described herein is embodied in the advanced communication software (ACS) application programs developed by applicant and installed in the integrated PDA/GPS cell phones used herein.

A plurality of cellular phone/PDA/GPS devices each having a CPU and ACS application programs and databases provides a communication network in conjunction with a remote server with: (a) the ability to establish a digital network of participants each having PDA/GPS phone devices, to exchange identity, position and status information that is displayed as symbols superimposed on a map on each of the participant's PDA/GPS devices (the digital information exchanged in the identity, position and status messages causes the appropriate pre-stored symbol that represents each network participant to be displayed at the correct latitude and longitude); (b) the ability to display additional information by touching the PDA touch screen display at the correct map location, thus indicating its latitude and longitude, and selecting a soft switch to indicate the type of entity (i.e. fire, restaurant, and similar entities); (c) the ability to make calls to or send data to remote cell phone devices by touching their display symbols and selecting appropriate soft switches; (d) the ability to layer a sufficient number of soft or virtual switches or virtual buttons displayed on the PDA touch screen display to perform the above functions without overlaying the display map; and (e) the ability to change the symbols and nomenclature of a series of soft switches in each cell phone device in a network of participants for different operating environments.

A communication network server acts as a forwarder for IP communications between any combination of cell phone/PDA device users and/or PC based users. Network participant location, identity and status messages are sent to the server by each user. Network participant entered tracks are also sent to the server. Tracks are symbolic paths and representations of the location and activity of other network participants displayed on all network participants' screens. Because this data is of interest to all the network participants, the server forwards the data received from one participant to all other participants, thus providing the information necessary for all network participants to know the identity, location and status of all other network participants on each display touch screen.

The server also acts as a forwarder of data addressed from one participant to one or more addressed participants, thus permitting the transmission of free text, preformatted messages, photographs, video, E-mail and URL data from one network participant to other selected network participants.

The above functions can also be accomplished using peer to peer WiFi, WiMax or other peer to peer communications. However, for use with cellular communications and to assure the level of security that cell phone companies require, a centralized static IP routable server is used.

The IP server also fills another role of being a database from which data can be requested by network participants (i.e. maps, satellite images, or other visual information) or can be pushed to network participants (i.e. symbology and soft switch changes, and the like).

It is an object of this invention to enable each participant in the communications net to cause their or other net participants to report their locations, identity and status on the communication net.

Another object of this invention is to enable each participant in the communications net to be able to easily transmit an entity of interest to the other participants of the net by touching the display screen at the entity's location on the map, thus selecting the soft switch representative of the entity's identity causing the symbol's location and identity to be transmitted on the network.

Another object of the invention is to provide a communication system having a plurality of individual cell phones that allow an operator of one cell phone to remotely control any of the other cell phone/PDA system phones including the ability to have an administrator or user: create new screen symbols and soft (virtual) switches in each user's cell phone device for a specific environment; create new symbol modifiers or text messages and associate them with a soft switch; to associate application software to soft switches; to associate URLs with soft switches and to cause the data to be transmitted to a server for retransmission to other network participants.

In accordance with these and other objects which will become apparent hereinafter, the instant invention will now be described with particular reference to the accompanying drawings.

PREFERRED EMBODIMENT OF THE INVENTION

A method and cell phone device communication system that joins a communications network of participants using handheld cell phones having integrated, CPU, PDA and GPS circuitry with advanced communications software (ACS) application programs that allow an administrator with a personal computer or other appropriate input device to modify other participants' remote cell phone devices that contain ACS symbology and nomenclature and soft switch nomenclature and functions for a specific environment such as police, work, fire, military or other group of interest.

A communication network server acts as a forwarder for IP communications between any combination of cell phone device users and/or PC based users. Network participant location, identity and status messages are sent to the server by each user. Network participant entered symbols representative of entities (some times called tracks) are also sent to the server. Because this data is of interest to all the network participants, the server forwards the data received from one participant to all other participants, thus providing the information necessary for all network participants to know the identity, location and status of all other network participants for display on each participant cell phone device map display with symbols.

The server also acts as a forwarder of data addressed from one participant to one or more addressed participants, thus permitting the transmission of free text, preformatted messages, photographs, video, E-mail and URL data from one network participant to other selected network participants.

The above functions can also be accomplished using peer to peer WiFi, WiMax or other peer to peer communications. However, for use with cellular communications and to assure the level of security that cell phone companies require, a centralized static IP routable server is used.

The IP server also fills another role of being a database from which data can be requested by network participants (i.e. maps, satellite images, and the like) or can be pushed to network participants (i.e. symbology and soft switch changes, or other data).

Figure 1:
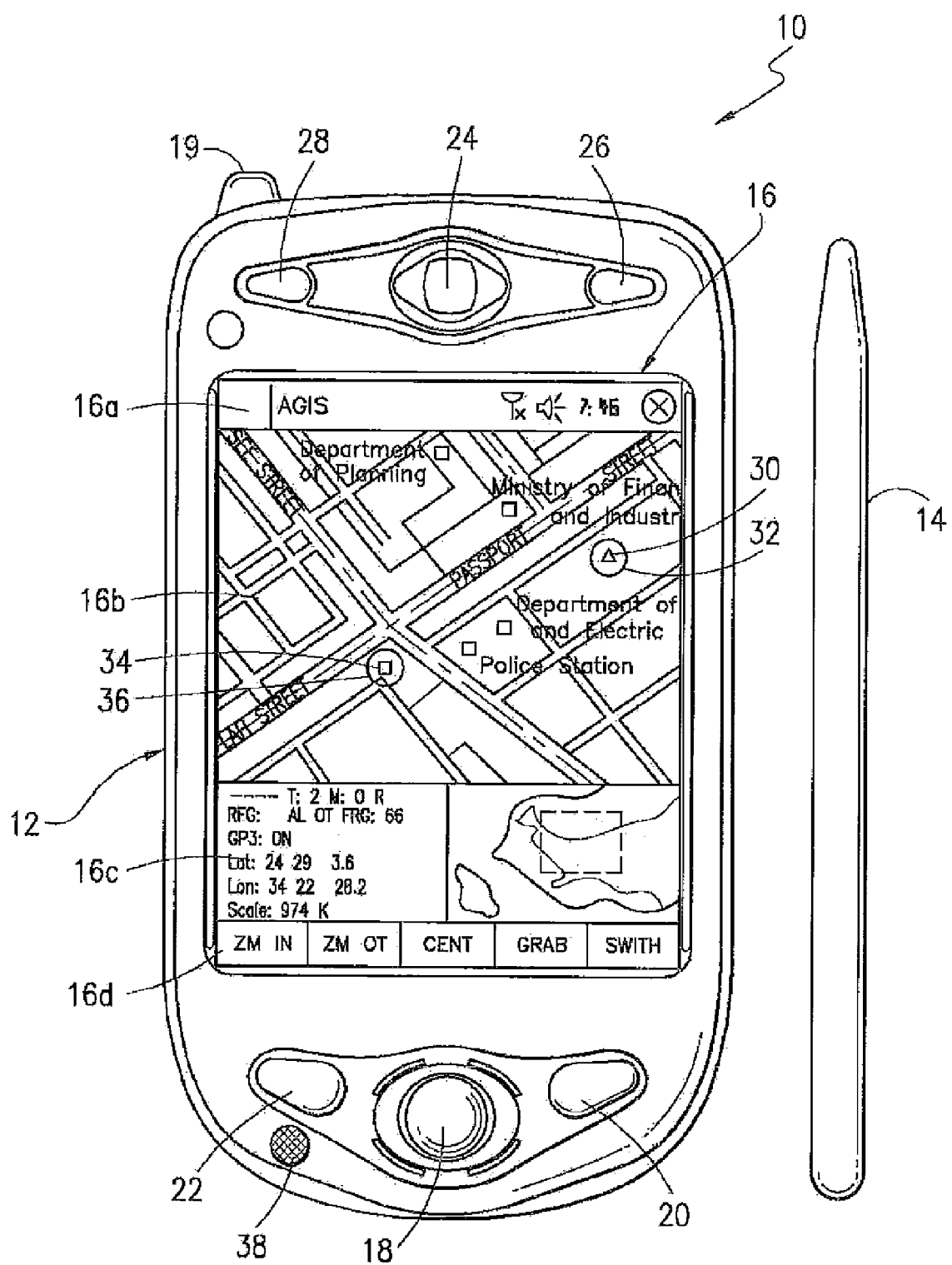
FIG. 1 shows a front elevation view of a cellular phone/PDA/GPS having a touch screen.

Referring now to the drawings and, in particular, FIG. 1, a small handheld cellular phone device 10 is shown that includes a personal digital assistant (PDA) and a global positioning system (GPS) receiver communications device integrated in housing 12, an on/off power switch 19 for the entire device, a microphone 38, and an LCD display 16 that is also a touch screen system. The small area 16a is the navigation bar that depicts the cell phone, GPS and other status data and the active software. Each cell phone device includes a CPU and databases that store information useful in the communication network. The CPU also includes a symbol generator for creating touch screen display symbols discussed herein. With the touch screen 16, the screen symbols are entered through GPS inputs or by the operator using a stylus 14 (or operator finger) by manipulatively directing the stylus 14 to literally touch display 16. The soft switches 16d displayed on the display 16 are likewise activated by using a stylus 14 and physically manipulatively directing the stylus 14 to literally touch display 16. The display x, y coordinates of the touched point are known by a CPU in the PDA section of the communication system in housing 12 that can coordinate various information contained in the PDA relative to the x, y coordinate position on the display 16. Inside housing 12 is contained the conventional cellular phone elements including a modem, a CPU for use with a PDA and associated circuitry connected to speaker 24 and microphone 38. A GPS navigational receiver that receives signals from satellites that can determine the latitude and longitude of the cellular phone housing 12 can be internal or external to the housing 12. Conventional PDA/cellular phones are currently on sale and sold as a unit (or with an external connected GPS) that can be used for cellular telephone calls and sending cellular SMS and TCP/IP or other messages using the PDA's display 16 and computer (CPU). The GPS system including a receiver in housing 12 is capable of determining the latitude and longitude and, through SMS, TCP/IP, WiFi or other digital messaging software, to also transmit this latitude and longitude information of housing 12 to other cellular phone devices in the communication network via cellular communications, WiFi or radio. The device 10 includes a pair of cellular phone hardware activating buttons 20 to turn the cellular phone on and 22 to turn the cellular phone off. Navigation pad actuator 18 is similar to a joy or force stick in that the actuator 18 manually provides a response to movement commands that can be used by the PDA's software to move a cursor on display 16. Switches 26 and 28 are designed to quickly select an operator specified network software program. Speaker 24 and microphone 38 are used for audio messages. Switch 19 at the top left of device 10 is the power on and power off switch for the entire device 10.

The heart of the invention lies in the applicant's ACS application programs provided in the device. The ACS programs are activated by clicking on an icon on the display 16 to turn the ACS programs on or off. Mounted on and within housing 12 as part of the PDA is the display 16 and the CPU. The internal CPU includes databases and software application programs that provide for a geographical map and georeferenced entities that are shown as display portion 16b that includes as part of the display various areas of interest in the particular local map section.

When looking at display 16, the software switches (soft switches) which appear at the very bottom of the display 16d are used to control by touch many of the software driven functions of the cellular phone and PDA. The soft switches are activated through the operator's use of the navigation pad 18, or a small track ball, force stick or similar hardware display cursor pointing device. Alternatively, the operator may choose to activate the software switches by touching the screen with a stylus 14 (or finger) at the soft switches' 16d locations. When some of the software switches 16d are activated, different software switches appear. The bar display 16d shows the software switches "ZM IN (zoom in)," "ZM OT (zoom out)," "CENT (center)" and "GRAB (pan/grab)" at the bottom of the screen. These software switches enable the operator to perform these functions. The "SWITH (switch)" software switch at the lower right causes a matrix of layered other software switches (soft switches) to appear above the bottom row of switches. Through use of the software switches, the operator can also manipulate the geographical map 16b or chart display.

When looking at FIG. 1, display symbols, depicting permanent or temporary geographical locations and buildings, are shown. For example, the police station is shown and, when the symbol is touched by the stylus or finger, the latitude and longitude of the symbol's location, as shown in display section 16c, is displayed at the bottom left of the screen. The bottom right side of display 16c is a multifunction inset area that can contain a variety of information including: a) a list of the communication link participants; b) a list of received messages; c) a map, aerial photograph or satellite image with an indication of the zoom and offset location of the main map display, which is indicated by a square that depicts the area actually displayed in the main geographical screen 16b; d) applicable status information; and e) a list of the communication net participants. Each network participant/user would have a similar device 10 shown in FIG. 1.

Also shown on the display screen 16, specifically the geographical display 16b, is a pair of different looking symbols 30 and 34, a small triangle and a small square, which are not labeled. These symbols 30 and 34 can represent communication net participants having cellular phone devices in the displayed geographical area that are part of the overall cellular phone communications net, each participant having the same device 10 used. The latitude and longitude of symbol 30 is associated within a database with a specific cell phone number and, if available, its IP address and email address. The screen display 16b, which is a touch screen, provides x and y coordinates of the screen 16b to the CPU's software from a map in a geographical database. The software has an algorithm that relates the x and y coordinates to latitude and longitude and can access a communications net participant's symbol or a fixed or movable entity's symbol as being the one closest to that point.

An administrator can be established for the entire communication network of devices with security codes for entering each user's ACS to make changes. All of the participants' cell phone numbers and IP addresses are stored either in each cell phone device or in a database in the server. In order to initiate a telephone call to the cellular phone user (communication net participant) represented by symbol (triangle) 30 at a specific latitude and longitude display on chart 16b, the operator touches the triangle 30 symbol with the stylus 14. The operator then touches a "call" software switch from a matrix of displayed soft switches that would overlay the display area 16c. Immediately, the cellular phone device will initiate a cellular telephone call to the cellular phone device user at the geographical location shown that represents symbol 30. A second cellular phone device user (communication net participant) is represented by symbol 34 which is a small square (but could be any shape or icon) to represent an individual cellular phone device in the display area. The ring 32 around symbol 30 indicates that the symbol 30 has been touched and that a telephone call can be initiated by touching the soft switch that says "call." When this is done, the telephone call is initiated. Other types of symbolic elements on the display 16 can indicate that a cellular phone call is in effect. Additionally, the operator can touch both symbol 34 and symbol 30 and can activate a conference call between the two cellular phone devices and users represented by symbols 30 and 34. Again, a symbolic ring around symbol 34 indicates that a call has been initiated.

Equally important, an administrator or selected user can call the police station or any other specific geographical facility displayed on the map, including: buildings, locations of people, vehicles, facilities, restaurants, or other entities, whose cellular phone numbers and, if available, E-mail addresses, IP addresses and their URLs (previously stored in the database) by touching a specific facility location on the map display using the stylus 14 and then touching the cellular phone call switch. As an example, the operator can touch and point to call a restaurant using a soft switch by touching the restaurant location with a stylus and then touching the call soft switch. The cellular phone device will then call the restaurant. Thus, using the invention described herein, each participant can touch and point to call to one or more other net participants symbolically displayed on the map, each of whom has a device as shown in FIG. 1a and can also point to call facilities that had been previously stored in the cell phone device's database. Furthermore, this symbol "hooking" and soft switch technique can be used to go to a fixed facility's website or to automatically enter the fixed facility's E-mail address in an e-mail.

Each cellular phone device is identified on the map display of the other participant/user cell phone devices by a display symbol that is generated on each user cell phone device display to indicate each user's identity. Each symbol is placed at the correct geographical location on the user display and is correlated with the map on the display. The operator of each cellular phone device may also select and enter one or more other fixed entities (buildings, facilities, restaurants, police stations, and the like) and geo-referenced events such as fires, accidents, or other events into its database. This information can be likewise transmitted to all the other participants on the communications net. The map, fixed entities, events and cellular phone device communication net participants' latitude and longitude information is related to the "x" and "y" location on the touch screen display map by a mathematical correlation algorithm.

When the cellular phone device user employs a stylus or finger to touch one or more of the symbols or a location displayed on the cellular phone map display, the cell phone device internal software causes the status and latitude and longitude information concerning that symbol or location to be displayed. In order to hook a symbol or "track" such as another net participant which represents an entity on the geo-referenced map display, or a fixed geographical entity such as a restaurant, police station or a new entity observed by a cell phone device user which is discussed below, the operator points at or near the location of a georeferenced symbol appearing on the cellular phone device display that represents a specific track or specific participant or other entity. The hook application software determines that the stylus is pointed close to or at the location of the symbol and puts a circle, square or other indication around the symbol indicating that amplification information concerning the symbol is to be displayed and indicating that additional data or change in data can be made to the indicated symbol. The hook application code then sends a message to the display application code to display the net participant, facility or entity's amplifying data. The display application code retrieves the primary data and amplification data concerning the symbol or entity from the database and displays the information at the correct screen location. The operator can then read the amplification data that relates to that specific symbol at the specific location. The cell phone device operator can also select soft switches on the touch screen display to change the primary data and amplification data. Furthermore, the operator can use a similar method of hooking and selecting to activate particular soft switches to take other actions which could include: making cellular phone calls, conference calls, 800 number calls; sending a free text message, operator selected preformatted messages, photographs or videos to the hooked symbol; or to drop an entered symbol.

Each known net participant has a cellular phone number, IP address and, if available, E-mail address that is stored in each participant's device database and in the server.

To use the communication system, the user starts the cellular phone device system by selecting the internal cell phone device and network software which causes: a) the cellular phone to be activated (if it has not already been activated); b) the GPS interface receiver to be established; c) a map of the geographic area where the user is located and user's own unit symbol to appear at the correct latitude and longitude on the map on the display; d) the locations of fixed facilities such as restaurants, hotels, fire departments, police stations, and military barracks, that are part of the database to appear as symbols on the map; e) the device selected item read out area which provides amplification information for the communications net participants or the entity that has been hooked (on the display screen) to appear on the display; f) an insert area that contains various data including: the list of net participants, a list of messages to be read, an indication of what portion of the map is being displayed in major map area and other information to appear on the display; and g) a row of primary software created "soft switches" that are always present on the display to appear.

For point to call network units and fixed facilities, the application code detects the x, y display screen location of the symbol that is designated by the user's stylus and translates the x, y coordinates to latitude and longitude and then: (1) searches the database to find the symbol at that location, (2) places a "hook" indicator (a circle, square or other shape) around the symbol, (3) displays any amplifying data and (4) obtains the symbol's associated phone number (or for VoIP calls an IP address) from the database. Upon receiving a "call" designation from the soft switch, the user's device's ACS causes the appropriate phone number or IP number to be called. Upon receiving an indication that the phone number is being called, the ACS software application code places a box around the symbol (color, dashed or the like). When the call is connected, the box changes to indicate that the connection is made. When the other party (net user) hangs up, the box disappears.

As each of the cell phone device participants reports its identity, location and status to the other participants' devices, the received data is geo-referenced and filed in their databases that are accessible by identity and by location. This data is then displayed on each cell phone display. When a request for data is received by touching the display screen, a location search is made by the ACS and a symbol modifier (circle, square, or the like) is generated around the symbol closest to the x, y position of the stylus. When the application code receives a soft switch command to place a phone call or send data, the software uses the phone number (or IP address) associated with the unit to place the call or to send data.

If a cell phone device receives a digital message that a call is being received, the receiving cell phone's ACS application code places a box or similar object around the transmitter symbol indicating who the call is from. When the call is answered, the application software changes the visual characteristics of the box. In a similar manner, when a phone receives a digital text message, photograph or video, a box appears around the transmitter's symbol indicating the transmitter of the message. The point to call network devices are participants and each one has a similar device with the same software for use as a total participant network. Other situations for calling facilities that are not part of the network are described below.

Thus, the user device is capable of initiating a cellular phone call by touch only, and initiating conference calls by touching the geo-referenced map symbols. Furthermore, by using a similar symbol touching technique, a cellular phone can send user selected messages to cause a remote cellular phone to display and optionally announce emergency and other messages and to optionally elicit a response from the remote cellular phone device.

Each of the network participants have the same communication cell phone/PDA/GPS device described herein. The method, device and system include the ability of a specific user device to provide polling in which other cellular phone devices, using SMS, internet or WiFi, report periodically based on criteria such as time, speed, distance traveled, or a combination of time, speed and distance traveled. The user can manually poll any or all of the cell phone devices that are used by all of the participants in the communication network having the same devices. The receiving cellular phone device application code responds to the polling command with the receiving cellular phone device's location and status, which could include battery level, GPS status, signal strength and entered track data. Optionally, the cell phone device users can set their cell phone devices to report automatically, based on time or distance traveled intervals or another criterion.

The soft switch application software causes a visual display on the touch screen of a soft switch matrix such as five switches across by six switches up (or another matrix) in which switch names are placed on the cellular/PDA display. The soft switch network application software knows the touch screen location of each of the switches in the matrix and the software routines that will be activated upon touching the switch. The switch names can be customized for a specific group of users such as police, firemen and military.

The bottom row of soft switches displayed on the touch screen remains visually fixed. These switches concern the functions that are the most often used. One of the switches causes a matrix of other soft switches to appear above the visually fixed soft switches. These switches are function soft switches, the activation of any one of which causes a different matrix of soft switches to appear, which are known as the action soft switches. When the action soft switches appear, the function soft switch, which caused the action soft switches to appear, itself appears as a label in the lower left (or some other standard location) indicating to the operator the function soft switch that has been selected. When the operator selects an action soft switch, the appropriate application software to accomplish the action is activated.

Upon receiving a soft switch activation message, the ACS accesses the appropriate task execution software which accomplishes the required tasks including: entry of track data, entry of track amplification data, transmission of alpha/numeric messages, photographs, videos, display of messages to be read, selection of map types, placing voice calls, placing conference calls and 800 conference calls, presenting different potential operator selections, control of the display actions, polling network participants, establishing nets of participants (groups) so that communications with all in the group can be accomplished with a single soft switch action, and dropping a previously entered track. By providing a matrix and layers of soft switches which are easily manipulated by a stylus, each cell phone device in the communication network is extremely efficient in accessing and coordinating the appropriate application program for the device to perform.

Referring now to FIGS. 2a through 2d, flow diagrams are shown that represent the ability of a system administrator (or a knowledgeable user) to change the cell phone/PDA soft switches and displayed symbology from one specific operational environment to another. Such a capability permits the user with a common ACS program for, as an example, police, in which the soft switches and their associated symbols had been defined to enable the rapid entry of police car and suspect symbols on the display, to be reprogrammed for use with fire departments in which the soft switches and their associated symbols are redefined to enable the rapid entry of fire trucks and different types of fire symbols. Reprogramming each ACS cell phone in the network as each cell phone user signs on the network assures that all cell phone device users in the network have all the same soft switches and symbology available for that particular operating environment. The administrator can customize each user's cell phone device for a specific environment such as police, fire or military by customizing each of the cell phone devices with specific symbology and specific soft switches.

In order to make the soft switches applicable for different uses, the system administrator can use a personal computer (PC) with soft switch naming and symbol generation software to associate the named or renamed soft switches with new symbols. The administrator can then upload the named or renamed soft switches to the network server. When the cell phone network participants sign on the network, the symbology and the soft switches associated with the symbology are automatically downloaded to the network participants' cell phone devices. Thus, the symbology and soft switches for different organizations can be customized to meet various users' requirements. This flexibility is especially important within the police and fire department operational environments, as there are geographical areas of the United States where law enforcement and fire departments use different voice codes and different symbols when responding to emergencies. An administrator (or a knowledgeable user) can use a method similar to the above to rename or create new soft switches and associate them with its or another developer's software, with E-mail addressing, web site addresses, symbol modifiers and text messages, thus causing the soft switches and the data that they are associated with to be downloaded to the network participants' cell phone devices.

Figure 2A:
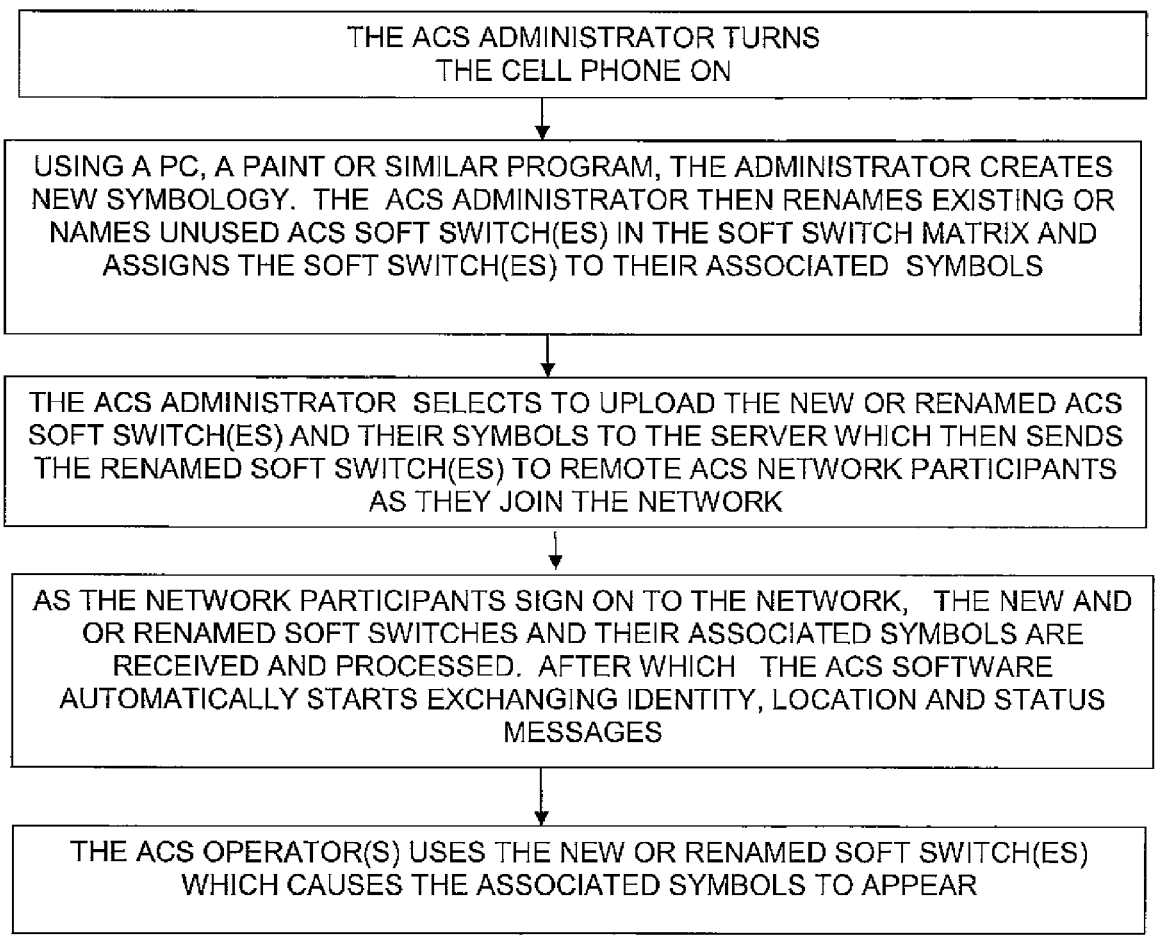
FIG. 2a shows a flow chart of a method for an administrator (or a knowledgeable user) to create a symbol using paint (or similar software) and then to rename or name a used soft switch and then to associate and transmit the symbols and soft switch names to the network server. The new symbols and new switches are then downloaded from the server to the network participants as the participants sign on to the network so that the newly named soft switch(es) with their associated symbols appear on all the network participants' cell phone devices.

FIG. 2a shows a flow chart of a method for an ACS network administrator (or a knowledgeable user) to rename or create new soft switches and assign symbology to them so that all cell phone devices in the network are reconfigured to a new standard. Using a PC, an administrator (or a knowledgeable user) creates symbols using a paint program and names unused or renames ACS soft switch(es) in the soft switch matrix and associates each with a newly or previously created symbol. An ACS administrator (or a knowledgeable user) uploads the renamed ACS soft switch(es) and their associated symbology to the server which then transmits the new or renamed soft switch(es) and their associated symbols to the remote ACS network participant(s) as they join the network, after which their cell phone devices commence to report their identity, location and status. When the ACS operator(s) use(s) the new or renamed ACS soft switch(es), they cause the appropriate symbol(s) to appear.

Figure 2B:
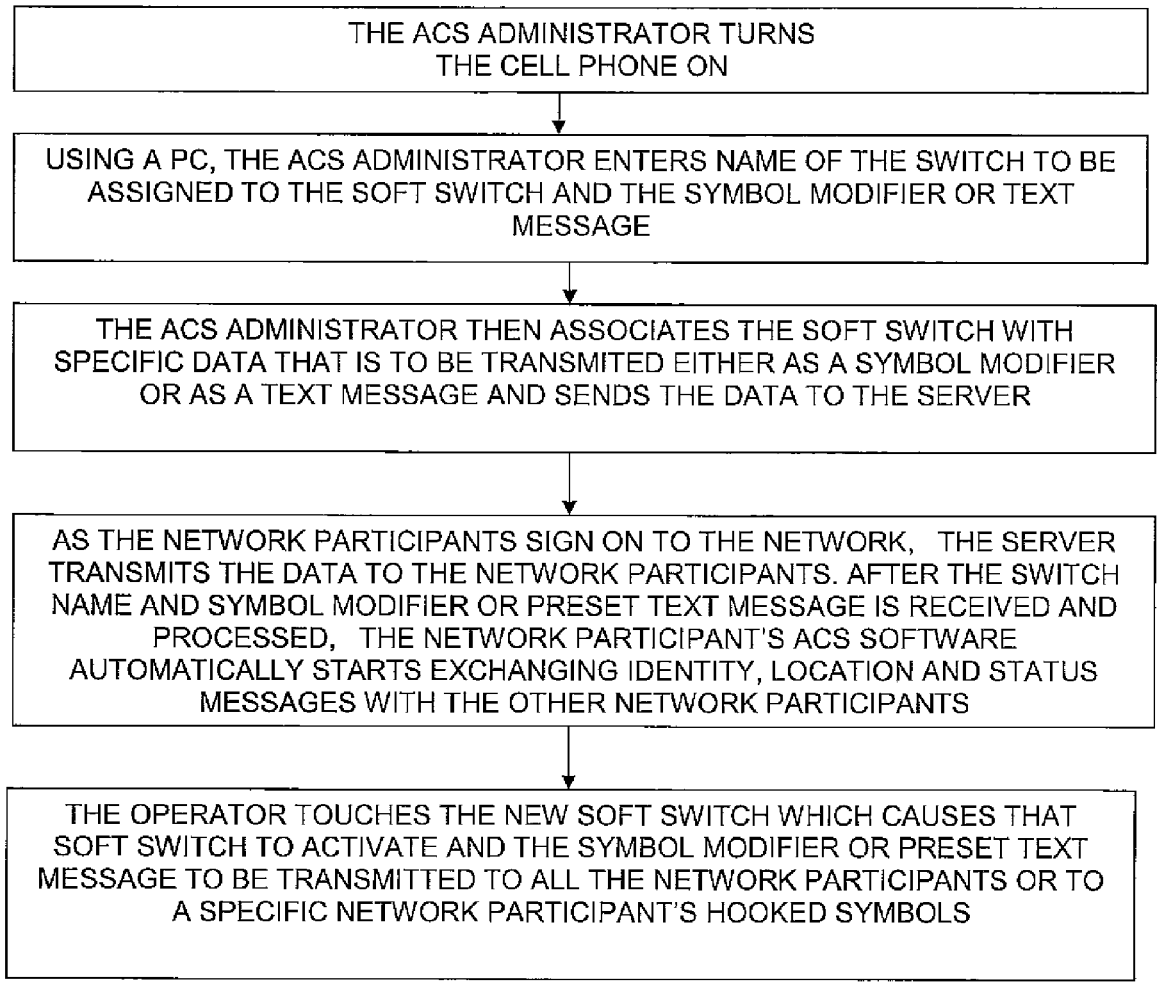
FIG. 2b shows a flow chart of a method for an administrator (or a knowledgeable user) using paint (or similar software) to create symbol modifier(s) or preset text message(s) and then to name or rename a used soft switch and then to associate the symbol modifiers/preset text messages and named and renamed soft switches and to transmit the associated data to the network server. The server downloads the data to the network participants as participants sign on to the network so that the soft switch(es) with their associated symbol modifier(s) appear on all the network participants' cell phone devices.

FIG. 2b shows a flow chart of a method for an ACS network administrator (or a knowledgeable user) to create new soft switches or rename switches and assign symbol modifiers or preset text messages to the soft switches so that all cell phone devices in the network are reconfigured to a new standard. Using a personal computer (PC), an administrator (or knowledgeable user) creates a symbol modifier shape using a paint program or similar software to create a symbol modifier or creates (types) a preset text message after which the administrator names unused or renames old soft switch(es) in the soft switch matrix. The administrator (or a knowledgeable user) then associates each soft switch with either a symbol modifier or a preset text message. The administrator uploads the new ACS soft switch(es) and their associated symbol modifier(s) or preset text message(s) to the network server which then transmits the new soft switch(es) and either the symbol modifier(s) or the preset text message(s) to the remote ACS network participant(s) as they join the network, after which their cell phone/PDAs commence to report their identity, location and status. When the ACS operator(s) use(s) the new or renamed ACS soft switch(es), the symbol modifier appears surrounding or on the symbol that was hooked when the modifier was selected or causes the display of a preset text message, either of which are then transmitted to a hooked network participant or to all the network participants.

Figure 2C:
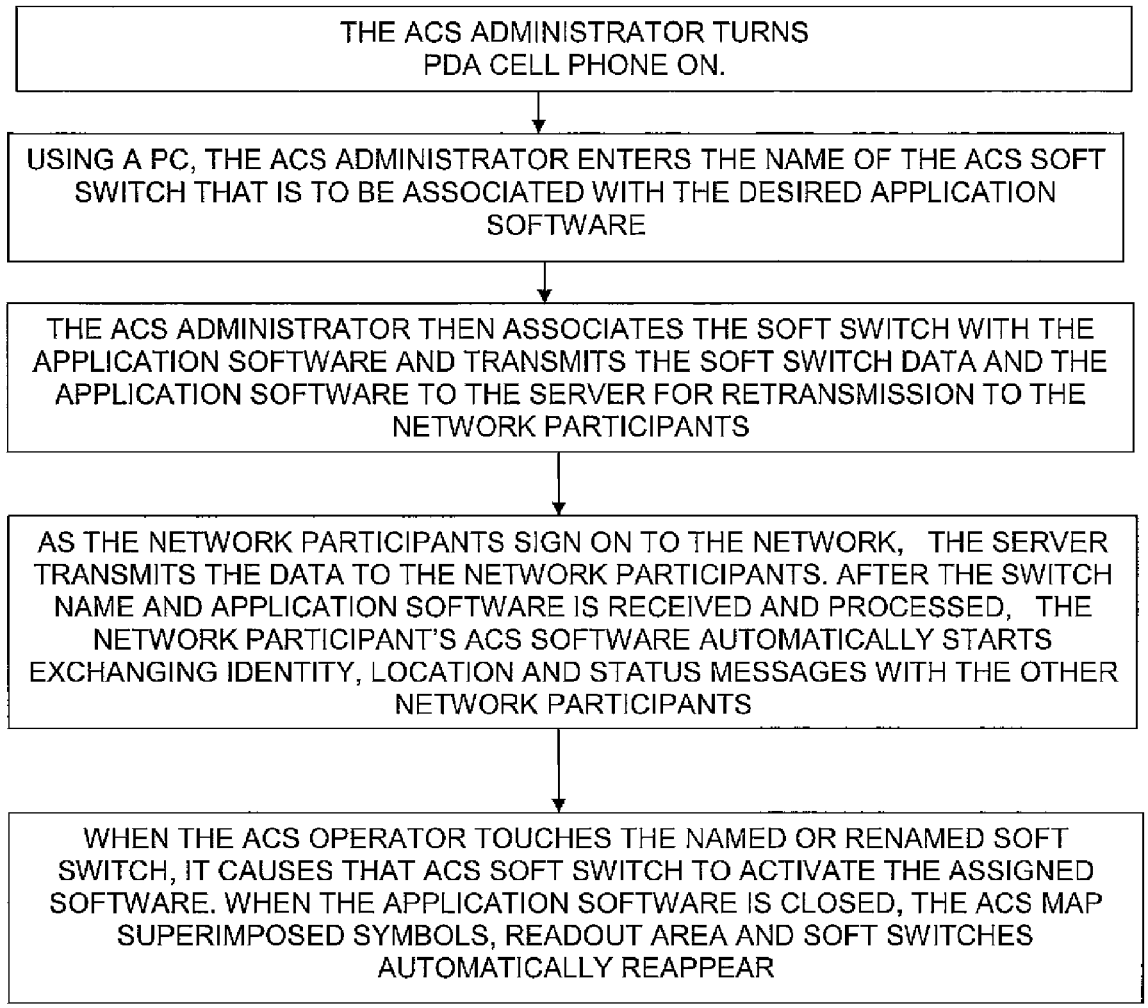
FIG. 2c shows a flow chart of a method for an administrator (or a knowledgeable user) to assign the application software to a soft switch and then to transmit the soft switch and the assigned application software to the network server which are then downloaded to the network participants as participants sign on to the network so that the soft switch(es) and the application software are contained on all the network participants' cell phone devices and, when the soft switch is activated by each participant, the application code is accessed.

FIG. 2c shows a flow chart of a method for an ACS network administrator (or a knowledgeable user) to create new soft switches or rename switches and assign the soft switch to software that is in the applicant's software library so that all cell phone devices in the network are reconfigured in a manner that permit them to access the application software through use of the soft switch. Using a PC, an administrator (or a knowledgeable user) names an unused or renames an old soft switch in the soft switch matrix. An administrator (or acknowledgeable user) then associates each soft switch with a call to software that is in the application library. The administrator (or knowledgeable user) then uploads the new ACS soft switch and the associated software to the server which then transmits the new soft switch and the application software to the remote ACS network participant(s) as they join the network, after which, their cell phone devices commence to report their identity, location and status. When the cell phone device operator touches the new or renamed soft switch, it causes the downloaded application software to activate and occupy the screen on a PDA or to appear as a window on the PC or Tablet. When finished using the software, the cell phone device operator closes the application software which causes the standard ACS map, symbology, readout areas and soft switches to reappear.

Figure 2D:
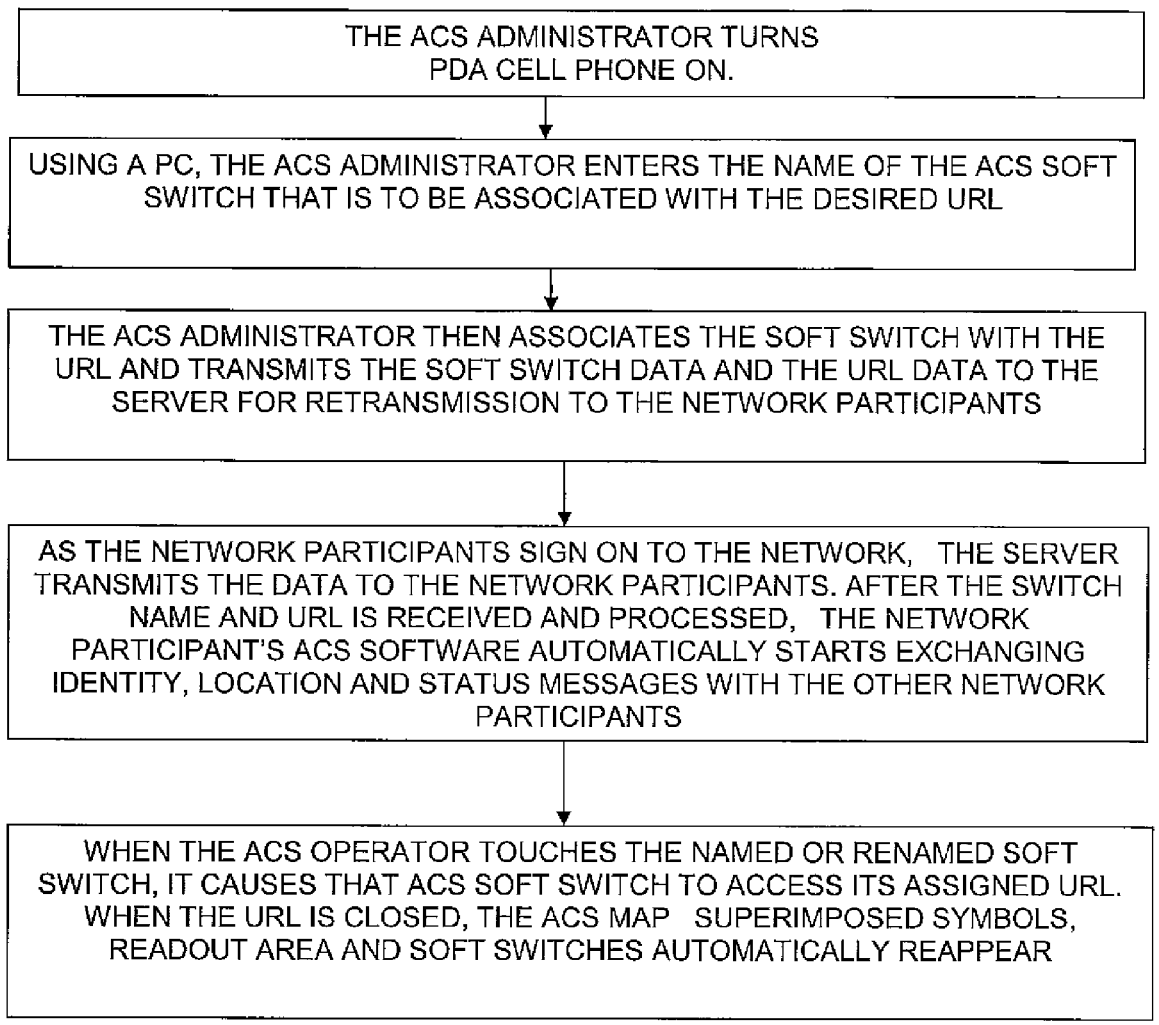
FIG. 2d shows a flow chart of a method for an administrator (or a knowledgeable user) to assign a web site's URL to a cell phone device soft switch and then to transmit the soft switch and the assigned URL to the network server. The soft switches and assigned URL are then downloaded to the network participants as participants sign on to the network so that the soft switch(es) and the URL(s) are contained on all the network participants' cell phone devices and, when the soft switch is activated by each cell phone device user, the web site is accessed.

FIG. 2d shows a flow chart of a method for an ACS network administrator (or a knowledgeable user) to create new soft switches or rename switches and assign the soft switch to a web site's URL so that all cell phone devices in the network are reconfigured in a manner that permits them to access the URL through use of the soft switch. Using a PC, an administrator (or a knowledgeable user) names an unused or renames an old soft switch in the soft switch matrix. An administrator (or a knowledgeable user) then associates a soft switch with an URL. The administrator (or knowledgeable user) then uploads the new ACS soft switch and the associated URL to the server which then transmits the new soft switch and the URL to the remote ACS network participant(s) as they join the network, after which their cell phone devices commence to report their identities, locations and status. When the cell phone device operator touches the new or renamed soft switch, it causes URL to be sent from the handset, which then causes the web site to occupy the display screen or to appear as a window on the PC or Tablet. When finished using the software, the cell phone/PDA operator closes or minimizes the software which causes the standard ACS map, symbology, readout areas and soft switches to reappear.

The instant invention has been shown and described herein in what is considered to be the most practical and preferred embodiment. It is recognized, however, that departures may be made there from within the scope of the invention and that obvious modifications will occur to a person skilled in the art.

What is claimed is:

1. A method of establishing a cellular phone communication network for designated participants, each having a similarly equipped cellular phone that includes the capability for: voice communications, free and operator selected text messages data exchange, photograph and video capture and transmissions, a CPU, a GPS navigation system and a touch screen display comprising the steps of:
   (a) generating one or more symbols on the touch display screen, each representing a different participant that has a cellular phone that includes software for said voice communication, free and operator selected text messages exchange, photograph and video exchange, a CPU, said GPS system and a touch screen;
   (b) providing and storing in each of the participant cellular phones one or more cellular phone telephone numbers, each cellular phone number of which relates to a different symbol of each of the participants in the communication network or on a server;
   (c) providing initiating cellular phone calling software in each cellular phone that is activated by touching a symbol on the touch display that automatically initiates a cellular phone call using the stored cellular phone number to the participant represented by the symbol;
   (d) generating a geographical location chart on said display screen to show the geo-referenced location of each of the symbols representing the participants in the communication network by latitude and longitude; and
   (e) using software to create new or modify old symbols and associate the symbol to a new unused soft switch or a renamed existing soft switch and then downloading the new or renamed soft switch and the associated symbol to the cell phone and remote cell phone(s) so that the new or renamed soft switch and associated symbol can be used on the cell phone.

2. A method as in claim 1, including the steps of:
assigning soft switches to enter symbol modifiers or transmit preset text message data that are then downloaded to the user's cell phone and remote cell phone(s) so that the cell phone soft switch causes the designated symbol modifier or preset text message to be transmitted.

3. A method as in claim 1, including the step of:
assigning soft switches to access application software and then downloading the soft switch and the assigned application software to the user's cell phone and remote cell phone(s) so that the cell phone soft switch accesses the assigned application software and when the application software is closed, causes the network participant's display and messaging software to reappear.

4. A method as in claim 1, including the step of:
assigning a soft switch to a web site URL address and then downloading the soft switch and the URL address to the user's cell phone and remote cell phone(s) so that, when the soft switch is activated, the soft switch accesses the web site, upon which the web site appears on the display and closing the web site causes the network participant's display and messaging software to reappear.

5. A communication system to provide a cellular phone network for a group of participants, each of the participant's having an individual portable cellular phone that includes voice communication, free and operator selected text messages, photographs and video, a CPU and a GPS navigational system that can accurately determine the location of each cellular phone, each of the cellular phones in the communications net of participants containing:
   said CPU and memory;
   a touch screen display;
   symbol generator in said CPU that can generate symbols that represent each of the participants in the communication network on the display screen;
   a database that stores the individual telephone numbers related to each of the symbols each of which represents a participant in the communication network;

cellular phone call initiating software in said CPU connected to the telephone number database and the touch screen and the symbols on the touch screen whereby touching an individual symbol will automatically initiate a cellular phone telephone call to the user represented by the symbol;

said display including databases that display geographical information that includes showing the geo-referenced location of each of the symbols representing participants in the communication network, fixed locations, and entered items of interest; and administrator software to create new or modify existing display symbols and associating a symbol to a new unused soft switch or a renamed existing soft switches and then downloading the new or renamed soft switch to the cell phone and remote cell phone(s) so that the symbols and new renamed soft switches can be used on all network users cell phones.

6. A system as in claim 5, including:

administrator software to assign soft switches to enter symbol modifiers or reset text message data into a digital message and then downloading the software to the user's cell phone and remote cell phone(s) so that the cell phone soft switch causes the designated data to be transmitted.

7. A system as in claim 5, including:

administrator software to assign soft switches to access application software and then down-load the soft switch and the assigned application software to the user's cell phone and remote cell phone(s) so that the cell phone soft switch accesses the assigned application software and, when the application software is closed, causes the network participant's display and messaging software to reappear.

8. A system as in claim 5, including:

administrator software to assign soft switches to a web site URL address and then download the soft switch and the URL address to the user's cell phone and remote cell phone(s) so that, when the soft switch is activated, the soft switch accesses the web site, upon which the web site appears on the display and closing the web site causes the network participant's display and messaging software to reappear.

9. A cellular phone for use in a communication network for a plurality of participants comprising:

a cellular phone transmitter and receiver for transmitting and receiving voice communication, free and operator selected text messages, photographs, and video;

a small handheld portable housing containing said cellular phone transmitter and receiver;

a touch display screen mounted in said housing;

a modem connected to said cellular phone transmitter and receiver;

a CPU connected to said cellular phone transmitter and receiver;

a GPS navigation system connected to said CPU and to said cellular phone transmitter and receiver on said touch screen;

a database connected to said CPU that includes a list of telephone numbers that relate to specific symbols;

a symbol generator connected to said CPU and said database for generating symbols on said touch display screen;

CPU software that causes the exchange of data with other participants with a cellular phone;

call initiating software connected through said CPU and said telephone database and said symbol generator whereby, when a user touches the symbol displayed on a touch display screen, the cellular phone call is automatically initiated to the cellular phone represented by the symbol;

a geographical database connected to said CPU to provide a geographical display on said touch screen representing a defined geographical area that also displays symbols representing each of the participants by latitude and longitude; and administrator software to create new or modify old symbols and associate the symbol to a new unused soft switch or a renamed existing soft switch and then download the new or renamed soft switch to the cell phone and remote cell phone(s) so that the new or renamed soft switch and symbol can be used on the cell phone.

10. A cell phone as in claim 9, including:

administrator software to assign soft switches to enter symbol modifiers or preset text message data into a digital message and then download the software to the user's cell phone and remote cell phone(s) so that the cell phone soft switch causes the designated data to be transmitted.

11. A cell phone as in claim 9, including:

administrator software to assign soft switches to access application software and then down-load the soft switch and the assigned application software to the user's cell phone and remote cell phone(s) so that the cell phone soft switch accesses the assigned application software and, when the application software is closed, causes the network participant's display and messaging software to reappear.

12. A cell phone as in claim 9, including:

administrator software to assign soft switches to a web site URL address and then download the soft switch and the URL address to the user's cell phone and remote cell phone(s) so that, when the soft switch is activated, the soft switch accesses the web site, upon which the web site appears on the display and closing the web site causes the network participant's display and messaging software to reappear.

* * * * *